United States Patent [19]

Hoshino et al.

[11] Patent Number: 4,949,303

[45] Date of Patent: Aug. 14, 1990

[54] INFORMATION RETRIEVAL CONTROL SYSTEM WITH INPUT AND OUTPUT BUFFERS

[75] Inventors: Masayuki Hoshino, Odawara; Haruo Hayami, Yokohama, both of Japan

[73] Assignees: Hitachi, Ltd.; Nippon Telegraph and Telephone Corporation, both of Tokyo, Japan

[21] Appl. No.: 302,074

[22] Filed: Jan. 25, 1989

Related U.S. Application Data

[63] Continuation of Ser. No. 845,350, Mar. 28, 1986.

[30] Foreign Application Priority Data

Mar. 29, 1985 [JP] Japan .................................. 60-63605

[51] Int. Cl.$^5$ .............................................. G06F 3/06
[52] U.S. Cl. .................................................... 364/900
[58] Field of Search ............................. 354/200, 900

[56] References Cited

U.S. PATENT DOCUMENTS

| | | | |
|---|---|---|---|
| 4,476,526 | 10/1984 | Dodd | 364/200 |
| 4,489,378 | 12/1984 | Dixon et al. | 364/200 |
| 4,490,784 | 12/1984 | Ives et al. | 364/200 |
| 4,583,194 | 4/1986 | Cage | 364/900 |
| 4,637,023 | 1/1987 | Lounsburn et al. | 371/38 |
| 4,654,782 | 3/1987 | Bannai et al. | 364/200 |

*Primary Examiner*—David L. Clark
*Attorney, Agent, or Firm*—Antonelli, Terry, Stout & Kraus

[57] ABSTRACT

An information retrieval system for retrieving and processing data from a large-capacity, rotating recording medium at a high speed includes an RAM storing attribute data, address registers specifying RAM addresses, an attribute data operation unit, and an FIFO device enqueuing and sequentially outputting length information of the attribute data. By providing the FIFO device for obtaining the length information from the data read from the recording medium, the need to obtain this data by accessing the RAM is avoided and high speed retrieval becomes possible.

11 Claims, 3 Drawing Sheets

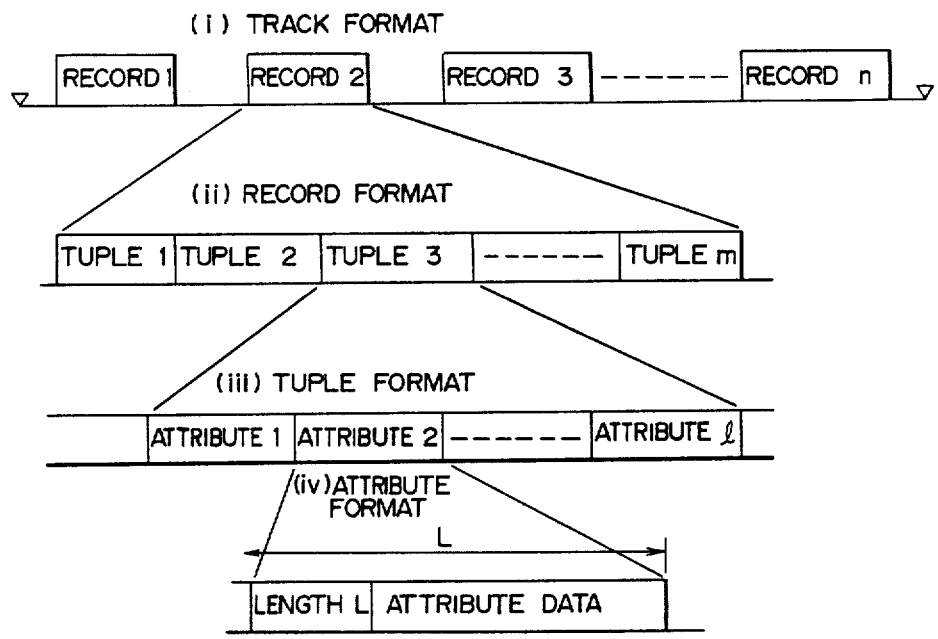
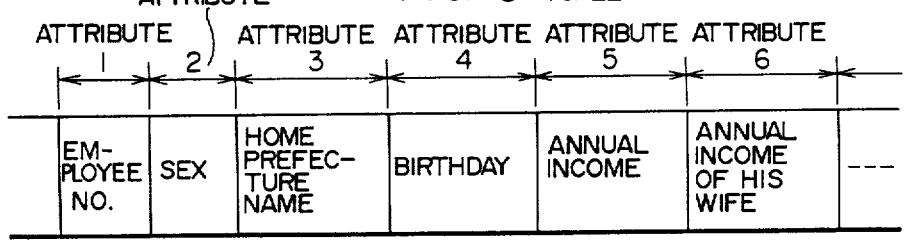

ATTRIBUTE QUEUE BUFFER 2

RETRIEVAL DATA FORMAT

INFORMATION RETRIEVAL CONTROL SYSTEM WITH INPUT AND OUTPUT BUFFERS

This application is a continuation of application Ser. No. 845,350, filed Mar. 28, 1986.

BACKGROUND OF THE INVENTION

The present invention relates to an information retrieval control system, and in particular, to an information retrieval control system of a database machine system in which retrieval processing is achieved in synchronism with a data item read from a rotating recording medium, such as a disk device.

The conventional information retrieval control system using hardware control has been described in the ACM Transactions on Database Systems, Vol. 9, No. 2, June 1984, namely, "A Parallel Pipelined Relational Query Processor" by Won Kim, Daniel Gavid, and David J. Kuck. A queue processor discussed in this literature comprises only four processing pipes and a plurality of random access memory (RAM) modules. It has been described that each pipe is designed to process a relational tuple (logical record) in a bit-serial fashion and a parallel processing is executed on the relational tuple for each primitive database operation constituting a composite relational queue.

However, this description assumes that all data read is correct. Actually, there exist errors in the obtained data, although the number thereof is quite small. In this regard, for example, an important processing to be effected in a case where a data error is found in the data read from a disk unit has not been discussed. Moreover, a method for acquiring the relative position and the length of an attribute has not been described.

SUMMARY OF THE INVENTION

It is therefore an object of the present invention to provide a data retrieval system which solves the problems described above and makes it possible to accomplish a data retrieval processing without causing any excessive read wait time or latency when reading data from a data storage.

Another object of the present invention is to provide a retrieval data error correction system which automatically acquires data length information of retrieval data to cope with an occurrence of a retrieval data error.

Still another object of the present invention is to provide an information retrieval control system with a function in which a single error correction mechanism is applicable to a buffer unit keeping data read from a large capacity storage and in which a plurality of attribute data items can be read from the buffer unit at a higher speed.

To achieve these objectives, the information retrieval control system of the present invention comprises input/output buffers in which a RAM storing retrieval objective data read from a disk unit and a RAM storing retrieval data subjected to an operation or extraction are disposed in the same address space, a queue buffer for acquiring and storing relative positions and lengths of all attributes associated with the retrieval objective data, a plurality of address registers disposed to obtain only those attribute data items required for an operation or extraction, said registers specifying relative positions and lengths of the attributes, and retrieval operation means for reading attribute data specified by said address registers and for effecting a retrieval operation.

The input/output buffers share an input/output bus and an address bus and utilizes the buses in a timeshared manner to obtain data therefrom, and when an error is detected in retrieval objective data, the pertinent data is read from said input/output buffers, thereby correcting the data in said input/output buffers based on error correction information supplied from the disk unit. In addition to a magnetic or optical recOrding disk, any rotating storage medium may be used for the disk medium.

BRIEF DESCRIPTION OF THE DRAWINGS

The objects and features of the present invention will become more apparent from the consideration of the following detailed description taken in conjunction with the accompanying drawings in which:

FIG. 2 is a diagram illustrating a format of data on a disk;

FIG. 3 is a diagram depicting an example of a tuple including attributes of a retrieval data;

DESCRIPTION OF THE PREFERRED EMBODIMENTS

Figure 1:
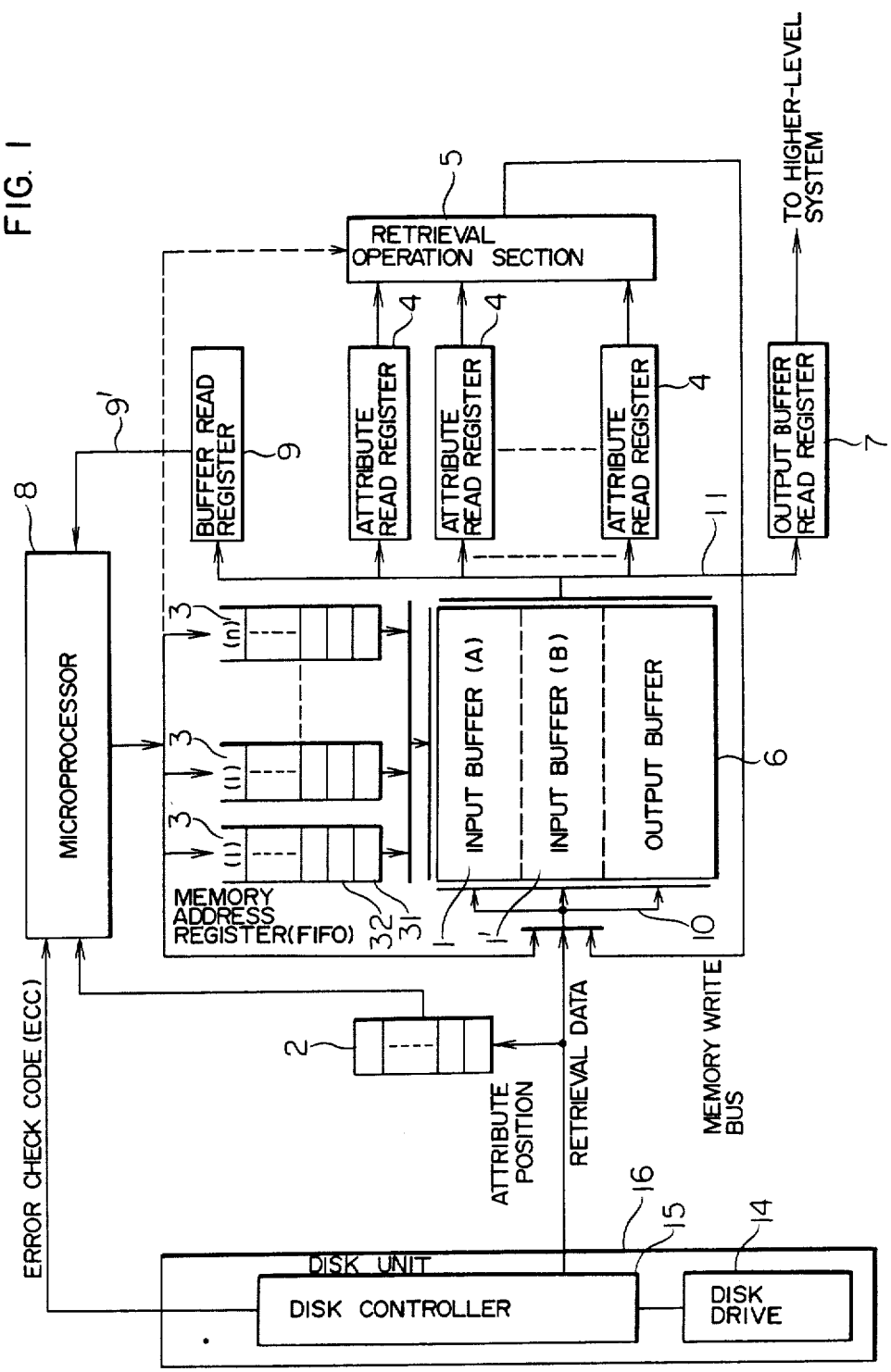
FIG. 1 is a schematic block diagram illustrating an information retrieval control system embodying the present invention.

The principle of the present invention will be first described.

A large-sized hardware system is required for exactly synchronizing retrieval processing with an operation of a rotating body. However, this is not practical. To overcome this difficulty, it is desirable in this regard to effect a retrieval processing with an indispensable restriction that a latency or rotational delay does not take place, thereby almost synchronizing the processing with the rotating body. When the retrieval objective data has a variable length, however, there exists a complexity with respect to control that the relative position and length of each attribute in a tuple (logical record) can be determined only after the entire tuple is read. Consequently, a memory (buffer) area storing at least a tuple is required in the hardware configuration. Furthermore, if a retrieval processing for a tuple is not completed before the next tuple is read, a latency takes place, which indicates that another tuple must be further stored in the buffer area. In addition, although the contents of the memory can be read to acquire the relative positions and lengths of all attributes of a tuple, this requires an unacceptably long time; therefore, it is desirable that the relative position and the length are automatically obtained by use of a hardware system or a microprogram concurrently with the operation of loading the memory therewith. Although it occurs rarely, if a data item read from a disk unit includes an error, the relative position and the length of the obtained attribute must be corrected immediately when the store operation is achieved. However, since the entire tuple is stored in the memory in this case, the data can be read again from the memory after a correction thereof is conducted by a microprogram. Since the latency occurs due to the error correction also in the conventional system, the overall throughput is not lowered in this case.

As a method for implementing a higher-speed data retrieval, an independent memory can be prepared for each essential information retrieval function. Namely, a memory may be independently disposed for each operation function such as selection, restriction, or projection so as to independently store the necessary attribute data, which enables a higher-speed retrieval processing. When compared with the error in the data read from a disk, the intermittent error in the data read from the memory occurs, owing to a characteristic of the memory, at a frequency exceeding an ignorable level. Consequently, each memory must include an error correction circuit (ECC). When a lot of ECC functions are disposed, the hardware system of the peripheral circuit associated with the memory is increased, which results in a deterioration of its reliability. To solve this problem, the memory areas storing tuples (and those storing the retrieval result) are gathered into a memory space so that the data is read therefrom in a timeshared manner for the operations such as the selection, restriction, and projection by use of the common address assignment. The difficulty of deterioration of the memory throughput in this method can be overcome only by compensating for the byte width of each read/write operation.

FIG. 1 is a schematic block diagram of an information retrieval control system illustrated as an embodiment of the present invention.

This system comprises input buffers (A) 1 and (B) 1', an output buffer 6, an attribute queue buffer 2, and memory registers 3 each including a plurality of first-in first-out (FIFO) registers. The configuration further comprises a plurality of attribute read registers 4, a retrieval operation section 5, an output buffer read register 7, a microprocessor 8, and a buffer read register 9. The input buffers (A) 1, (B) 1' and the output buffer 6 each are implemented by use of a random access memory (RAM) in which the same address space is shared among these buffers.

A retrieval objective data item read from a disk unit 16 is stored in the input buffer (A) 1 or (B) 1' through a memory write bus 10, and at the same time, the relative positions of all attributes in a tuple are automatically acquired by the attribute queue buffer 2. The input buffers (A) 1 and (B) 1' are used to alternatively store data read from the disc unit. At a point where a tuple of data structured in the tuple format of FIG. 2 is stored in the input buffer 1 or 1', the microprocessor 8 reads from the attribute queue buffer 2 the relative positions of all attributes in the tuple, namely, addresses 0, $L_1$, $L_1+L_2$, $L_1+L_2+L_3$, etc, and recognizes the respective lengths $L_1$, $L_2$, $L_3$, etc. based on the difference therebetween. According to a retrieval condition indicated by a higher-level system, the microprocessor 8 extracts only the relative positions and lengths of the attributes necessary for the retrieval and adds the address to the relative position of the attribute to the first address of the buffer (A) 1 or (B) 1' to translate the relative address into an absolute address; thereafter, the address and the length are converted according to the FIFO register format and are respectively stored in FIFO register 31, 32, and so forth. There exists a one-to-one correspondence between the memory address registers 3 and the attribute read registers 4. The data constituted from the absolute address and the length of an attribute in the input buffer 1 or 1' is stored in the respective attribute read register 4 under control of the microprocessor 8.

The attribute read register 4 sequentially reads the attribute data from the input buffer 1 or 1' according to the data indicating the absolute address and length in the corresponding memory address register 3 and transfers the obtained data to the retrieval operation section 5. The attribute data subjected to an operation or extraction in the retrieval operation section 5 is written again in the output buffer 6 via the memory write bus 10, and then the attribute data is read through the output buffer read register 7 and is transmitted to the higher-level system.

The first address and length of a retrieval objective data item read from the disk unit and those of the output buffer 6 in which the attribute data subjected to the retrieval operation is stored are also indicated by the respective memory address registers 3.

If an error check code (ECC) outputted from a disk controller 15 indicates that an error exists in the retrieval objective data read from the disk unit 16, the microprocessor 8 reads the error data via the input buffer 1 or 1' through the buffer read register 9. Based on the error correction information contained in the ECC, the microprocessor 8 corrects the erroneous data, loads the memory address register 3 again with the address and length, stores the resultant data in the input buffer 1 or 1' at the original address, then executes the retrieval operation again. The number, n of the pairs of memory address register 3 and attribute read register 4 is determined so as to satisfy the tuple format necessary for the user.

In FIG. 1, since the relative position and length of each attribute in a tuple are obtained by the attribute queue buffer 2 each time a tuple is stored in the input buffer 1 or 1', the microprogram need not be executed to access the retrieval data in the input buffer 1 or 1' to acquire the relative position and length. As a consequence, a higher-speed retrieval operation can be accomplished even when the variable-length data format is supported. In addition, since the input buffers 1, 1' and the output buffer 6 are allocated to the same address space, the number of input/output buses related to the memory modules is reduced, thereby implementing a simple system having a higher reliability. Each data item of the input buffer 1 or 1' specified by a memory address register 3 is read into an attribute read register 4 in a timeshared manner. Moreover, since this system is so configured to allow the microprogram to access the input buffer 1 or 1', a single error correction mechanism can be commonly used for data read errors.

FIG. 2 is a diagram illustrating a general data format of data on a disk, whereas FIG. 3 is a diagram depicting an example of a tuple comprising attributes.

As shown in FIG. 2 the track format of data on a disk is formed with a plurality of records 1-n each being separated by a gap. A record comprises a plurality of tuples 1-m, a tuple includes a plurality of attributes 1 to l, and an attribute is constituted by length data L and attribute data.

Assume that the higher-level system issues a condition for the tuple as shown in FIG. 3, for example, "Extract all tuples of the employees for whom the total of employee annual income and that of his wife exceeds 5,000,000 Yen".

When conducting a retrieval by use of the system of FIG. 1, the microprogram is executed under control of the microprocessor 8 to add the contents of attributes 5-6, namely, the annual income of the pertinent employee and that of his wife, and then the resultant data of the addition is written as a different attribute in the input buffer 1 or 1'.

If the address and length information of the attribute of the total value resulting from the addition is loaded in a memory address register 3, only the specified attribute data is fed to the retrieval operation section 5, thereby achieving a retrieval operation.

Figure 4:
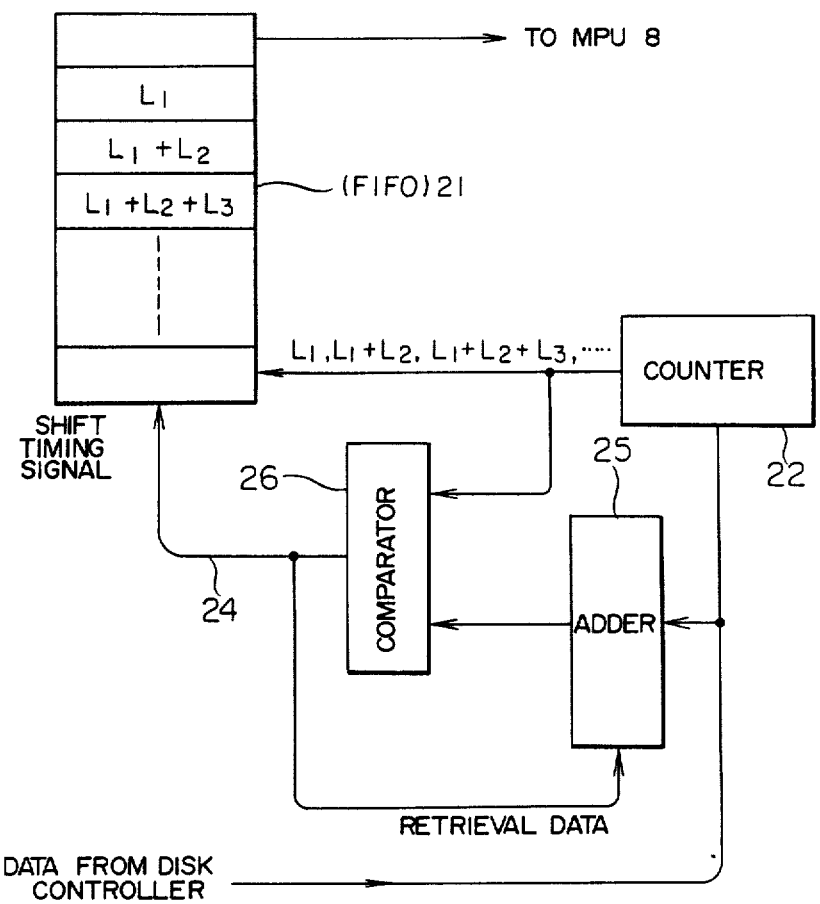
FIG. 4 is a diagram demonstrating an example of an attribute queue buffer.
Figure 5:
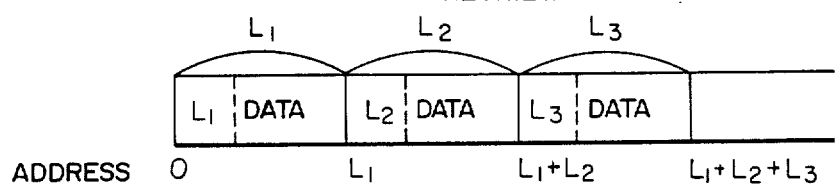
FIG. 5 is a diagram illustrating a format of a retrieval data.

FIG. 4 is a schematic block diagram demonstrating in detail an example of the attribute queue buffer 2. An FIFO register 21 is a buffer which receives and enqueues data sent from a counter 22 and delivers the data to the MPU 8 in the input order or in the first-in, first-out sequence by shifting the data in a step-by-step manner according to a timing signal 24. The content of the counter 22 is incremented by one for each byte of the attribute data associated with the retrieval data from the disk controller 15. An adder 25 is connected for receiving and accumulating the length data items $L_1$, $L_2$, etc. of the attributes and outputs the resultant data to a comparator 26. If the output value equals the count value, a shift timing signal 24 is delivered. A new relative position data is inputted to the FIFO register 21 at the same time when the shift operation is conducted. The timing signal 24 is also sent from the comparator 26 to the adder 25 so as to indicate an accumulation timing.

As another embodiment of the attribute queue buffer 2, the accumulation may be achieved by the microprocessor 8 with the queue data set as $L_1$, $L_2$, and $L_3$.

In still another embodiment, when an error is detected in a retrieval data, a correct data obtained by use of the error correction information may be written in the buffer at an address of the pertinent erroneous data.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

We claim:

1. An information retrieval system for retrieving and processing attribute data items included in a plurality of tuples which form a plurality of records recorded on tracks of a rotating recording medium, each of said attribute data items having an attribute data portion and a length information portion which indicates the length of said attribute data portion, comprising:
   (a) input/output buffer means including a first RAM for storing the attribute data items of at least one tuple read from the rotating recording medium and a second RAM for storing data obtained by processing data residing in an address space which is continuous in said first and second RAMs;
   (b) means for supplying attribute data items read out from said rotating recording medium to said input/output buffer means for storing therein;
   (c) means including a plurality of address registers coupled to said input/output buffer means for specifying addresses based on position and length information for reading of selected attribute data items stored in said input/output buffer means, each of said plurality of address registers including a sequence of queue buffers serially connected to sequentially provide said addresses to said input/output buffer means;
   (d) retrieval operation means connected to said input/output buffer means for effecting an operation processing on attribute data items read out of said input/output buffer means, and for storing data resulting from the operation processing in said second RAM of said input/output buffer means; and
   (e) control means for obtaining position and length information of each attribute data item contained in said data read from the rotating recording medium in parallel with storing the attribute data items of said at least one tuple into said input/output buffer means from said rotating recording medium, and for sequentially supplying the addresses of selected attribute data items based on said position and length information to said address registers.

2. An information retrieval system according to claim 1 wherein said control means includes;
   a first-in, first-out buffer responsive to said attribute data items read from said rotating recording medium for storing attribute length information; and
   processor means responsive to said attribute length information in said first-in, first-out buffer for translating the attribute length information into at least one address of an attribute data item stored in said input/output buffer means.

3. An information retrieval system according to claim 2 wherein said control means includes;
   means for counting the attribute data items read out of said rotating recording medium and stored in said input/output buffer means;
   adder means for accumulating length data for each attribute data item contained in the length data portion of the attribute data items; and
   comparator means for comparing the output from said counting means with the output from said adder means and for outputting a timing signal to effect a shift operation on the attribute length information in said first-in, first-out buffer.

4. An information retrieval system according to claim 2 wherein said input/output buffers include an output buffer read register connected to said second RAM for receiving data resulting from the operation processing of said retrieval operation means and for sending said data to a higher-level system.

5. An information retrieval system according to claim 1 wherein said retrieval operation means has a plurality of attribute read registers, each being paired operationally with a respective one of said plurality of address registers for separately storing attribute data items read out of input/output buffer means on the basis of addresses received from the respective address register.

6. An information retrieval system according to claim 1 further including means for supplying to said control means an error check code indicating whether or not data read from the rotating recording medium includes an error, and wherein said control means includes means for correcting data in said input/output buffers based on the error check code.

7. An information retrieval system according to claim 5 further including a buffer read register connected to said input/output buffer means for supplying an attribute data item to said control means for error correction.

8. An information retrieval system comprising:
   input/output buffers including a RAM storing attribute data items included in a plurality of tuples which form a plurality of records recorded on tracks of a rotating recording medium of a disk unit and a RAM storing attribute data items which have been subjected to processing, each of said attribute data items having an attribute data portion and a length information portion which indicates the length of said attribute data portion;

means for supplying attribute data items read out from said rotating recording medium to said input/output buffer means for storing therein;

a queue buffer for storing length information of all attribute data items contained in the length information portion of said attribute data items read from said disk unit in parallel with storing the attribute data items of said at least one tuple into said input/output buffer means from said rotating recording medium;

control means coupled to said queue buffer for generating addresses of selected attribute data items in said input/output buffers on the basis of said length information in said queue buffer;

a plurality of address registers coupled to said input/output buffers and said control means for registering addresses of said selected attribute data items for a retrieval operation in said input/output buffers; and retrieval operation means for reading from said input/output buffers attribute data specified by the addresses registered in said address registers and for effecting a processing thereof.

9. An information retrieval system according to claim 8, wherein said control means comprises a microprocessor connected to said retrieval operation means, and wherein input/output and address buses are connected to said input/output buffers and are shared in a time-shared manner among said input/output buffers, and said microprocessor includes means responsive to detection of an error in an attribute data item for reading said attribute data item having said error from said input/output buffers and for correcting said attribute data item based on error correction information received from the disk unit.

10. An attribute queue buffer for storing length information relating to attribute data items transferred from a disk unit to an input/output buffer via a data bus, comprising:

first means connected to said data bus and including a store buffer for storing respective values indicating a length of each attribute data item included in a plurality of tuples which form a plurality of records recorded on tracks of a rotating recording medium of said disk unit, in parallel with storing the attribute data items of at least one tuple into said input/output buffer means from said rotating recording medium; and second means responsive to the data on said data bus for sequentially shifting said length indicating values in said store buffer to sequentially provide data for specifying addresses for said input/output buffer.

11. An information retrieval system for retrieving and processing data including plural attribute data items included in a plurality of tuples which form a plurality of records recorded on tracks of rotating recording medium comprising:

(a) input/output buffers including a first RAM storing attribute data items read from the rotating recording medium and a second RAM storing data representing the result of operation processing on the data read from the recording medium in an address space continuous in both of said first and second RAMS;

(b) a plurality of address registers coupled to said input/output buffers for registering addresses of selected attribute data items to be read out of said input/output buffers;

(c) a plurality of attribute read registers connected to said input/output buffers, and each operating with a respective one of said plurality of address registers for separately storing attribute data items which have been read from said input/output buffers in response to addresses supplied from said respective address registers;

(d) retrieval operation means connected between said plurality of attribute read registers and said input/output buffers for effecting operation processing on said attribute data items stored in one of said input/output buffers in parallel with reading of the data from the recording medium into another of said input/output buffers; and (e) means including a first-in, first-out buffer responsive to a read operation of data in said input/output buffers for receiving length information of each attribute data item contained in data as it is read from the rotating recording medium and stored in said input/output buffers and for sequentially supplying addresses of selected attribute data items to said address registers for application to said input/output buffers.

* * * * *